US008072462B2

(12) United States Patent
Stam

(10) Patent No.: US 8,072,462 B2
(45) Date of Patent: Dec. 6, 2011

(54) SYSTEM, METHOD, AND COMPUTER PROGRAM PRODUCT FOR PREVENTING DISPLAY OF UNWANTED CONTENT STORED IN A FRAME BUFFER

(75) Inventor: Joseph Scott Stam, Holland, MI (US)

(73) Assignee: NVIDIA Corporation, Santa Clara, CA (US)

( * ) Notice: Subject to any disclaimer, the term of this patent is extended or adjusted under 35 U.S.C. 154(b) by 451 days.

(21) Appl. No.: 12/274,955

(22) Filed: Nov. 20, 2008

(65) Prior Publication Data

US 2010/0123729 A1 May 20, 2010

(51) Int. Cl.

| | |
|---|---|
| ***G09G 5/36*** | (2006.01) |
| ***G06T 15/50*** | (2006.01) |
| ***G06T 15/60*** | (2006.01) |
| ***G06T 1/00*** | (2006.01) |
| ***G06F 15/00*** | (2006.01) |
| ***G06F 15/80*** | (2006.01) |

(52) U.S. Cl. ......... 345/545; 345/426; 345/501; 345/505

(58) Field of Classification Search .................. 345/502, 345/505, 519, 545, 426, 501

See application file for complete search history.

(56) References Cited

U.S. PATENT DOCUMENTS

| | | | | |
|---|---|---|---|---|
| 6,771,269 | B1 * | 8/2004 | Radecki et al. | 345/503 |
| 6,829,582 | B1 * | 12/2004 | Barsness | 704/275 |
| 7,421,604 | B1 * | 9/2008 | Mimberg | 713/340 |
| 2007/0195099 | A1 * | 8/2007 | Diard et al. | 345/501 |
| 2008/0049027 | A1 * | 2/2008 | Hauke | 345/502 |
| 2008/0134282 | A1 * | 6/2008 | Fridman et al. | 726/1 |

FOREIGN PATENT DOCUMENTS

| | | | |
|---|---|---|---|
| CN | 1747536 | A | 3/2006 |
| KR | 20000014069 | A | 3/2000 |
| KR | 20000059647 | A | 10/2000 |
| KR | 20050038396 | A | 4/2005 |

OTHER PUBLICATIONS

U.S. Appl. No. 12/207,916 filed on Sep. 10, 2008.

"About iShield," copyright 2004, Guardward, Inc., http://www.guardwareinc.com/ishield/.

Notice of Preliminary Rejection from Korean Patent Application No. 10-2009-11976, dated Mar. 28, 2011.

First Office Action from Chinese Patent Application No. 200910210841.4, dated Mar. 23, 2011.

Notice of Reasons for Rejection from Japanese Patent Application No. 2009-189944, dated Sep. 13, 2011.

* cited by examiner

*Primary Examiner* — Kee M Tung
*Assistant Examiner* — Jacinta M Crawford
(74) *Attorney, Agent, or Firm* — Zilka-Kotab, PC

(57) ABSTRACT

A system, method, and computer program product are provided for preventing display of unwanted content stored in a frame buffer. In use, unwanted content stored in a frame buffer is identified. Furthermore, display of the unwanted content is prevented based on the identification of the unwanted content.

18 Claims, 5 Drawing Sheets

SYSTEM, METHOD, AND COMPUTER PROGRAM PRODUCT FOR PREVENTING DISPLAY OF UNWANTED CONTENT STORED IN A FRAME BUFFER

FIELD OF THE INVENTION

The present invention relates to unwanted content, and more particularly to identification of unwanted content.

BACKGROUND

Traditionally, unwanted content (e.g. offensive content, etc.) has been identified for various purposes. For example, unwanted content has oftentimes been identified for blocking the unwanted content, alerting a potential viewer of the unwanted content, securing potential viewers from viewing the unwanted content, etc. However, conventional techniques for identifying unwanted content have generally exhibited various limitations.

Just by way of example, there is a significant amount of adult content available on the Internet which may be objectionable to many computer users or which a parent may want to prevent a child from viewing. As another example, in public areas, such as a library, it may be desirable to limit the type of content available (e.g. via the Internet, etc.). Although many content protection systems exist for sale in the consumer market, the vast majority of these rely on a database of known objectionable content, particular content being identified as objectionable, or by searching on keywords or other text identifiers which indicate the content may be objectionable. Unfortunately, these techniques are insufficient to protect against new and undiscovered content or content which is presented in a deceptive way seeking to trap a user into viewing it.

There is thus a need for addressing these and/or other issues associated with the prior art.

SUMMARY

A system, method, and computer program product are provided for preventing display of unwanted content stored in a frame buffer. In use, unwanted content stored in a frame buffer is identified. Furthermore, display of the unwanted content is prevented based on the identification of the unwanted content.

DETAILED DESCRIPTION

Figure 1:
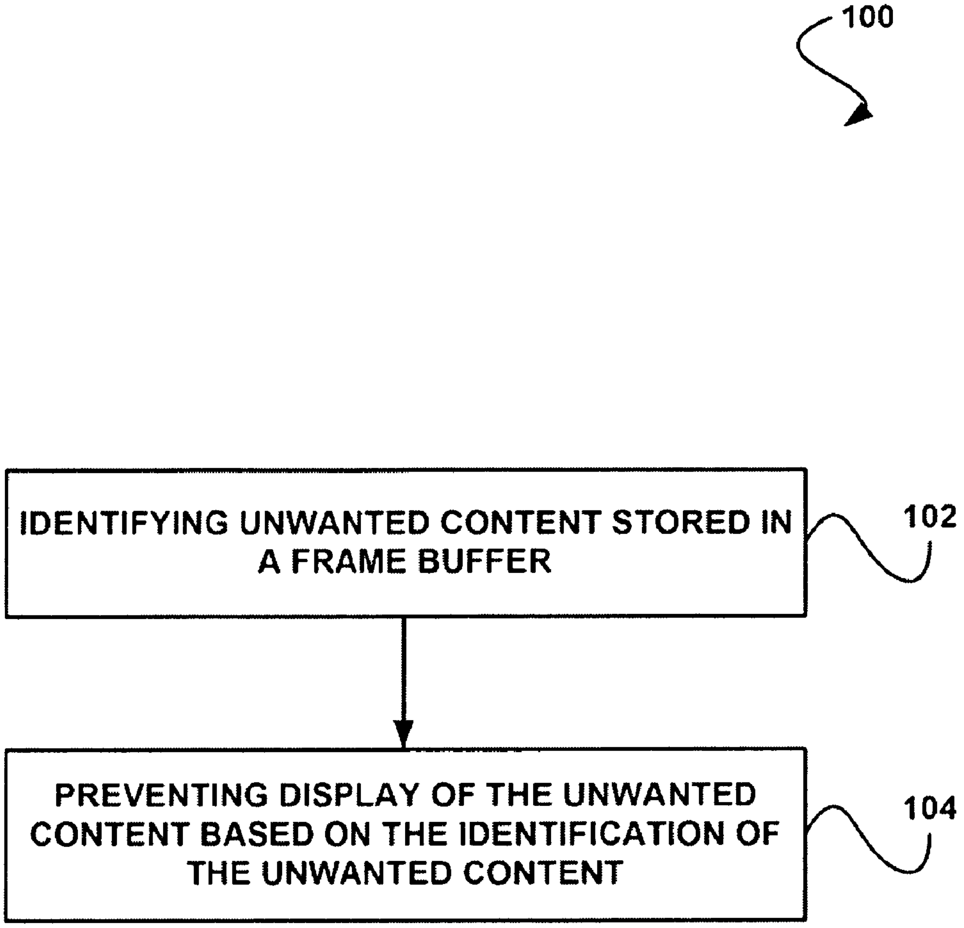
FIG. 1 shows a method for preventing display of unwanted content stored in a frame buffer, in accordance with one embodiment.

FIG. 1 shows a method for preventing display of unwanted content stored in a frame buffer, in accordance with one embodiment. As shown in operation 102, unwanted content stored in a frame buffer is identified. With respect to the present description, the unwanted content may include any content stored in a frame buffer that is unwanted. In various embodiments, the unwanted content may include visual content (e.g. a web page, video, etc). Just by way of example, the unwanted content may include pornography, profanity, and/or any other type of data that is determined (e.g. predetermined, etc.) to be unwanted.

Additionally, the frame buffer in which the unwanted content is stored may include a buffer for storing each frame of the unwanted content. For example, the frame buffer may store a digital representation of an image of the unwanted content. To this end, the frame buffer may store an image of the unwanted content to be displayed via a display, regardless of a program utilized to identify the unwanted content, an operating system installed on a computer utilized to identify the unwanted content, a type of Internet connection of such computer, etc.

In one embodiment, the unwanted content may be identified by determining that content stored in the frame buffer is unwanted. Just by way of example, the image represented by the content stored in the frame buffer may be compared with known unwanted images. Further, the unwanted content may be identified as a result of a match between the image represented by the content stored in the frame buffer and the known unwanted images.

As another example, a policy (e.g. rules) may be applied to the image represented by the content stored in the frame buffer. To this end, the unwanted content may be identified as a result of a determination that at least a portion of the image violates the policy. Of course, however, the unwanted content may be identified in any desired manner.

In one embodiment, the unwanted content may be identified in response to a manually generated command to enable analysis of content stored in the frame buffer. For example, a user may utilize a graphical user interface (GUI) for enabling the analysis of content stored in the frame buffer. Such analysis may result in the identification of the unwanted content.

In another embodiment, the unwanted content may be identified in response to an automatically generated command to enable analysis of content stored in the frame buffer. As an option, the command may be automatically generated based on a load of a processor (e.g. graphics processor) performing the identification of the unwanted content. Just by way of example, the analysis may be enabled only if the load is below a predefined threshold.

Moreover, display of the unwanted content is prevented based on the identification of the unwanted content, as shown in operation 104. The display of the unwanted data may include any display via a display device. In various embodiments, the display of the unwanted content may include display via a television, display via a personal computer, etc.

Accordingly, the unwanted content may be prevented (e.g. blocked, etc.) from being displayed to a viewer via a display (e.g. computer monitor, television, etc.). By preventing unwanted content stored in the frame buffer from being displayed, the unwanted content may be prevented from being displayed at a last possible stage prior to display thereof. Of course, as another option, preventing the unwanted content from display may include terminating a display of the unwanted content after the unwanted content has already been displayed. Just by way of example, the unwanted content may be identified after an initial display thereof, such that upon identification of the unwanted content, the unwanted content may be prevented from being display for any further length of time.

It should be noted that the display of the unwanted content may be prevented in any desired manner. Just by way of example, the unwanted content may be prevented from being displayed by overwriting the unwanted content stored in the frame buffer with predefined content. Such predefined content may include a warning (e.g. warning message), an error message, a solid block of color or any other pattern, etc.

In one embodiment, the identifying and preventing may be performed by a central processing unit (CPU). The CPU may read content stored in the frame buffer by way of a graphics processing unit (GPU) in direct communication with such frame buffer, and may accordingly identify the content as unwanted. Moreover, the CPU may prevent display of the unwanted content based on the identification thereof by instructing the GPU not to display the unwanted content that is stored in the frame buffer.

In another embodiment, the identifying and preventing may be performed by a graphics processor, such as a GPU, etc. For example, code for performing the identifying and preventing may be implemented on the graphics processor. The graphics processor may be in direct communication with the frame buffer, as noted above. In this way, the graphics processor may optionally retrieve content directly from the frame buffer (e.g. without necessarily requiring other intermediary hardware to pass the content from the graphics processor to the frame buffer) for identifying such content as unwanted and for further preventing display of the unwanted content.

Many algorithms for identifying image content may be suitable for parallel processing on a graphics processor. The graphics processor may thus perform processing at speeds faster than that of the CPU, such that the identification of unwanted content and the prevention of the display of the unwanted content may optionally be performed more quickly than with the CPU. Furthermore, because of the greater processing speed of the graphics processor, the graphics processor may more efficiently perform the identification of unwanted content and the prevention of the display of the unwanted content, and thus may be capable of utilizing more thorough techniques for identifying the unwanted content, a wider variety of tests for identifying the unwanted content, etc. than otherwise capable of being provided via the CPU. Still yet, using the graphics processor for the identification of unwanted content and the prevention of the display of the unwanted content may prevent consumption of the CPU processing resources in performing such identification and prevention, thus leaving the CPU resources available for other running applications.

In yet another embodiment, the identifying and preventing may be performed utilizing GPU shader hardware. For example, code may run on the shader hardware for identifying the unwanted content stored in the frame buffer and preventing display of the unwanted content based on the identification thereof.

In still yet another embodiment, the identifying and preventing may be provided by computer code embodied on a graphics card (e.g. non-volatile memory of the graphics card), such that the computer code may be running whenever the graphics card is active. By providing the computer code for the identification of the unwanted content and the prevention of the display of the unwanted content on the graphics card, the computer code may optionally be incapable of being disabled (e.g. since it may be impossible to deactivate the computer code without physically removing the graphics card from a system employing such graphics card). Furthermore, by providing the computer code for the identification of the unwanted content and the prevention of the display of the unwanted content on the graphics card, the computer code may run completely independent of an operating system or other software on a computer on which the graphics card is implemented.

The graphics Processor may also be used to identify and prevent output of content other than image or video information. Many pattern-recognition algorithms may be suitable for parallel processing on GPUs and thus may allow efficient identification of many types of content, while alleviating the computational burden on the CPU. In another optional embodiment (not shown), unwanted audio may be identified. For example, the unwanted audio may be identified utilizing speech recognition, such that the unwanted audio may be converted to text and compared to text predetermined to be unwanted. Of course, the unwanted audio may also be identified by comparing the audio to audio predetermined to be unwanted. Thus, if a match is identified, the audio may be identified as unwanted. Of course, however, the unwanted audio may be identified in any desired manner.

Further, audible output of the unwanted audio may be prevented. For example, the unwanted audio may be overwritten with predefined audio, etc. Moreover, such identification of the unwanted audio and prevention of the audible output of the unwanted audio may be performed by a processor utilized for outputting audio. Thus, a processor that would otherwise provide an audible output of unwanted audio may prevent the audible output thereof based on the identification of the audio as unwanted.

As an option, a delay (e.g. three second, etc.) may be introduced to the unwanted audio (e.g. at a beginning of an audible output of the unwanted audio. As another option, the unwanted audio may be pre-scanned. To this end, the delay and/or pre-scanning may allow for a determination that the audio is unwanted to be made prior to output of the unwanted audio, such that the unwanted audio may be prevented from being output in response to a determination that such audio is unwanted.

It should be noted that any of the aforementioned description of FIG. 1 and/or foregoing description with respect to the remaining Figures may be utilized for providing further details of the above technique for preventing audible output of unwanted audio based on the identification thereof. Just by way of example, any reference to a display driver may be applied to the prevention of the unwanted audio output as a audio driver, any reference to a graphics processor may be applied to the prevention of the unwanted audio output as a processor for outputting audio, any reference to a frame buffer may be applied to the prevention of the unwanted audio output as a buffer for storing audio prior to audible output thereof, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
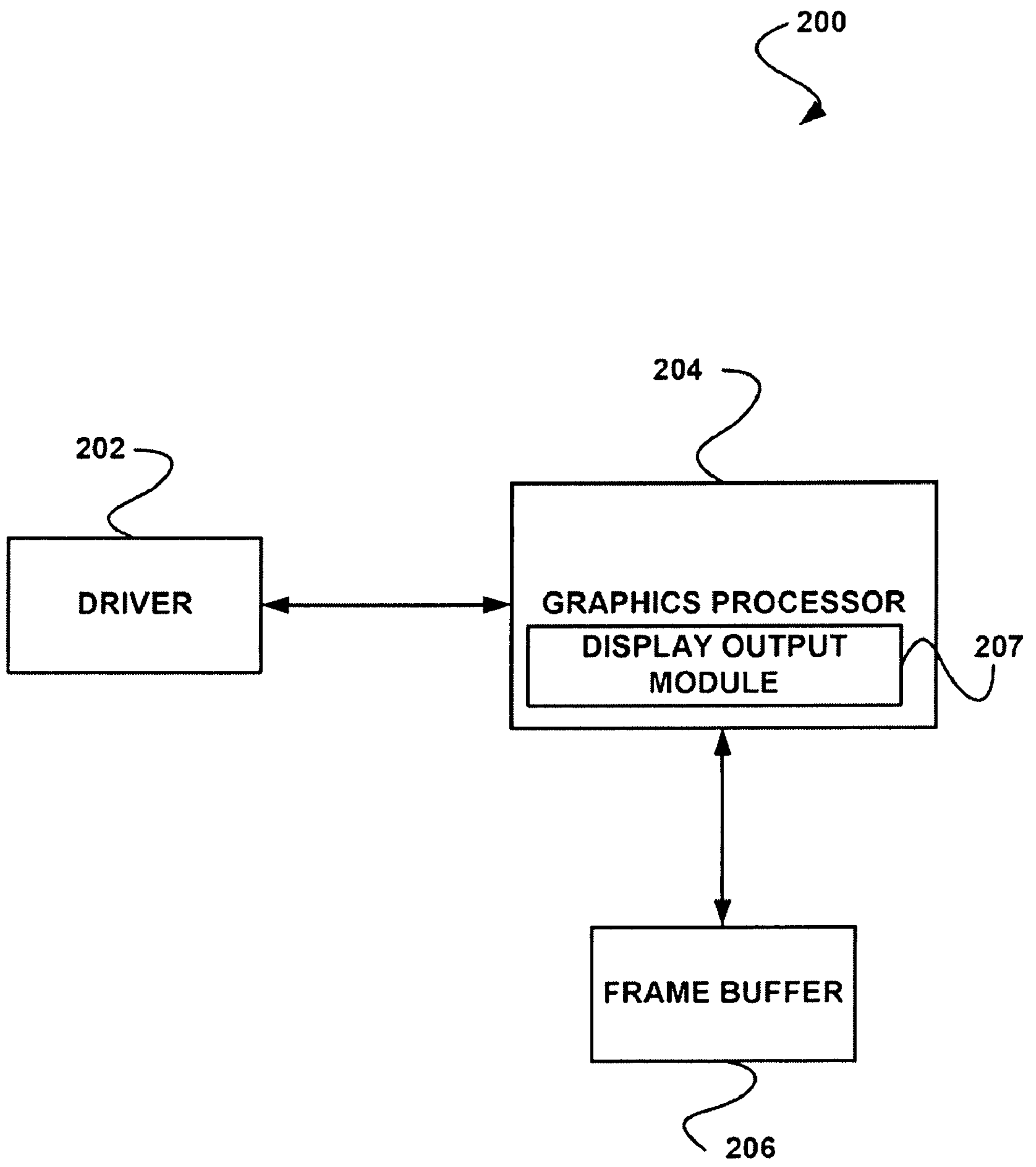
FIG. 2 shows a system for preventing display of unwanted content stored in a frame buffer, in accordance with another embodiment.

FIG. 2 shows a system 200 for preventing display of unwanted content stored in a frame buffer, in accordance with another embodiment. As an option, the system 200 may be implemented to carry out the method 100 of FIG. 1. Of course, however, the system 200 may be implemented in any desired environment. It should also be noted that the aforementioned definitions may apply during the present description.

As shown, a software graphics driver program 202 running on a computer (e.g. a personal computer) is in communication with a graphics processor 204. The driver 202 may include any software program capable of controlling and communicating with a graphics processor to display content (e.g. images, video, etc.) on a display device (not shown). Thus, the driver 202 may include a display driver 202.

Additionally, the graphics processor 204 may include any processor or collection of processors and auxiliary components capable of processing content for display of such content on the display device, such as a GPU. The graphics processor 204 may perform many of the computational tasks necessary to display content on the display device. For example, all content to be displayed may be sent by a CPU program to the graphics processor 204, such that the graphics processor 204 may process the content and generate a final image to be displayed on the display device. In various embodiments, the graphics processor 204 may be implemented as a computer add-on card, as part of a computer motherboard, integrated into a CPU, etc.

As also shown, the graphics processor 204 is in direct communication with a frame buffer 206. The frame buffer 206 is memory, which may be co-located with the graphics processor 204, used to store an image of content to be displayed on the display device. For example, the frame buffer 206 may receive content from an application to be displayed via the graphics driver 202, and may store an image of such content. Optionally, multiple frame buffers may be provided and frame buffer memory may be used to store other types of data processed by the graphics processor 204. In one embodiment, the frame buffer 206 memory may be dedicated memory collocated with the graphics processor 204 and accessed and controlled directly by the graphics processor 204. In another embodiment, the frame buffer 206 memory may be common with CPU system memory and may be accessed either directly or indirectly by the graphics processor 204.

A display output module 207 of the graphics processor 204 may read the content of the frame buffer 206 and generate the electrical signals needed to transmit the pixel values stored in the frame buffer 206 to the display device. The display output may be contained within the graphics processor (as shown), or may optionally be all or partially contained in separate components.

The operating system and various applications running on a computer may be in communication with the graphics driver 202 to generate content stored in the frame buffer 206 and then displayed on a display device via the display output module 207. These applications may send final pixel values for display, or may send commands and data to the graphics processor 202 to generate content for display.

To this end, the graphics processor 204 may identify unwanted content stored in the frame buffer 206 and may further prevent display of such unwanted content based on the identification thereof. In one embodiment, the graphics processor 204 may be programmed to perform the identification of the unwanted content and the prevention of display of the identified unwanted content. As an option, the graphics processor 204 may be programmed utilizing NVIDIA® Corporation's CUDA™ programming environment.

In another embodiment, the graphics processor 204 may be controlled by the graphics driver 202 to perform the identification of the unwanted content and the prevention of display of the identified unwanted content. For example, the driver 202 may be programmed with code for controlling the graphics processor 204 to analyze content stored in the frame buffer 206 for unwanted content. Optionally, the driver 202 may periodically instruct the graphics processor 204 to analyze content stored in the frame buffer 206 for identifying whether such content includes unwanted content. Just by way of example, the analysis may be performed utilizing iShield™ by Guardware LLC.

For example, in one embodiment, the graphics processor 204 may periodically analyze content stored in the frame buffer 206 for identifying whether such content includes unwanted content based on a schedule. In another embodiment, the graphics processor 204 may periodically analyze the content based on a load of the graphics processor 204. For example, if the load of the graphics processor 204 is above a predefined threshold, the graphics processor 204 may be automatically disabled from performing the analysis.

In yet another embodiment, the graphics processor 204 may be disabled from performing the analysis in response to a manual selection by a user (e.g. via a GUI, etc.) to disable such analysis. In still yet another embodiment, the graphics processor 204 may be disabled from performing the analysis in response to a determination that content stored in the frame buffer 206 is associated with a predetermined application (e.g. is output for display from a predetermined application). The predetermined application may include a whitelisted application, an application predetermined to not include unwanted content, etc.

In another embodiment, the graphics processor 204 may be configured (e.g. automatically or manually as described above) to only analyze a subpart of the content stored in the frame buffer 206. The subpart of the content may include only some frames of the content, only a portion of a frame of the content, etc. Of course, the graphics processor 204 may also analyze the content stored in the frame buffer 206 based on predefined policies, rules, etc.

As another option, graphics processor 204 may also analyze the content stored in the frame buffer 206 according to user input received via a GUI. For example, the GUI may allow the user to activate and deactivate the analysis or control the sensitivity of the analysis to various levels of content. For example, a probability measure that the content stored in the frame buffer 206 is unwanted may be generated. The graphics processor 204 may thus be configured to block only content with a probability that meets a predetermined probability threshold (e.g. as configured by the user via the GUI, etc.).

As yet another option, the graphics processor 204 may set to disable video output if the driver 202 has been tampered with or is disabled. Thus, display of the content stored in the frame buffer 206 may be prevented if the code for performing the analysis of such content is not active. Control of the analysis performed by the graphics processor 204 may optionally be protected by password or other authentication means. In this way, consumption of processing resources of the graphics processor 204 may be reduced.

The driver 202 may further control the graphics processor 204 to prevent display of unwanted content based on the identification of such unwanted content. Just by way of example, the driver 202 may instruct the graphics processor 204 to overwrite the unwanted content stored in the frame buffer 206 with other predetermined content. In this way, the graphics processor 204 may be utilized for identifying unwanted content stored in the frame buffer 206 and preventing display of such unwanted content based on the identification thereof.

In one embodiment, using the graphics processor 204 to identify the unwanted content and prevent display of the unwanted content instead of using a CPU for such purpose may allow the identification and prevention performed by the graphics processor 204 to be performed more efficiently. For example, the graphics processor 204 may directly access the frame buffer 206 due to the direct communication therebetween, and the CPU may thus be prevented from pulling content from the frame buffer 206 for analysis thereof and writing the content back to the frame buffer 206 after such analysis. Moreover, since the graphics processor 204 has direct access to the frame buffer 206, and controls what is in the frame buffer 206, the content stored in the frame buffer 206 may be examined by the graphics processor 204 for identifying unwanted content prior to display of the content stored in the frame buffer 206.

Figure 3:
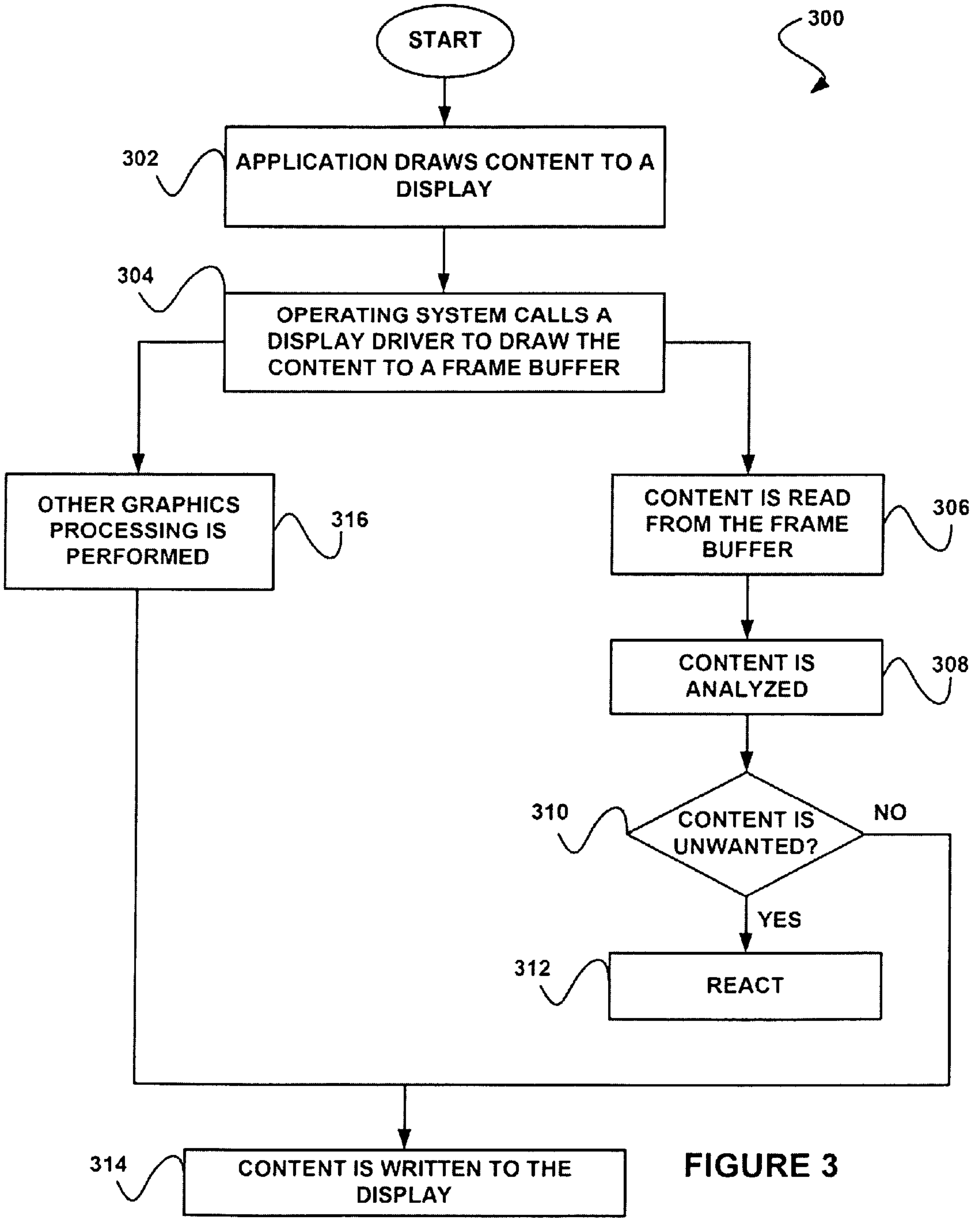
FIG. 3 shows a method for performing, in parallel, a determination of whether content stored in a frame buffer is unwanted and other graphics processing, in accordance with yet another embodiment.

FIG. 3 shows a method 300 for performing, in parallel, a determination of whether content stored in a frame buffer is unwanted and other graphics processing, in accordance with yet another embodiment. As an option, the method 300 may be carried out in the context and/or environment of FIGS. 1 and/or 2. Of course, however, the method 300 may be carried out in any desired environment. Again, it should be noted that the aforementioned definitions may apply during the present description.

As shown in operation 302, an application draws content to a display. The application may include any application capable of outputting content for display. In various embodiments, the application may execute on a personal computer, a television, etc. Just by way of example, the application may include a web browser.

Additionally, an operating system calls a display driver to draw the content to a frame buffer, as shown in operation 304. In this way, the display driver may write an image of the content to the frame buffer. Accordingly, the frame buffer may store the image of the content.

Further, as shown in operation 306, the content is read from the frame buffer. In one embodiment, the content may be read by a graphics processor. In another embodiment, the content may be read by a CPU. In yet another embodiment, the content may be read from the frame buffer using a display output pipeline of a graphics card.

Still yet, the content is analyzed, as shown in operation 308. With respect to the present embodiment, analyzing the content may include determining whether any portion of the content is unwanted. Just by way of example, the content may be compared to known unwanted content (e.g. content predetermined to be unwanted, such that a match may indicate that the content stored in the frame buffer is unwanted.

It is determined in decision 310 whether the content is unwanted. If the content is determined to be unwanted, a reaction is performed. Note operation 312. In one embodiment, the reaction may include writing over the unwanted content stored in the frame buffer with predefined content (e.g. an image displaying a warning, etc.), and subsequently displaying the content stored in the frame buffer. In another embodiment, the reaction may include transmitting a message indicating the unwanted content through the display driver to the operating system. In yet another embodiment, the reaction may include the operating system utilizing the CPU to log the identification of the unwanted content, provide a warning and/or error message to a user, etc.

If, however, it is determined in decision 310 that the content is not unwanted, the content is written to the display. Note operation 314. As also shown, the identification of any unwanted content stored in the frame buffer and the prevention of such identified unwanted content (operations 306-312) may be performed in parallel with other graphics processing, as shown in operation 316. In various embodiments, the other graphics processing shown in operation 316 may include rendering two dimensional content, rendering three dimensional content, executing other shader programs, displaying other content, etc.

As an option, operations 306-312 may run in the background either along side of the other graphics processing shown in operation 316 or interleaved with such other graphics processing. Just by way of example, a graphics processor performing operations 306-312 and 316 may dedicate a predetermined percentage (e.g. 10%) of processing capabilities to the identification of any unwanted content stored in the frame buffer and the prevention of such identified unwanted content (operations 306-312). Moreover, content associated with the other graphics processing (operation 316) may also be written to the display, as shown in operation 314. Furthermore, operations 306-312 may optionally be performed only occasionally rather than on every single frame. If unwanted content is only displayed for an extremely brief period, it may not necessarily be noticeable to the user. Thus, overall processing load may be reduced by only examining the frame buffer for unwanted content periodically. As another option, alternating portions of the frame buffer may be examined during each frame period, thus over several frame periods the entire display image may be examined, while reducing processing from that otherwise required to examine the entire display image at each frame period.

Figure 4:
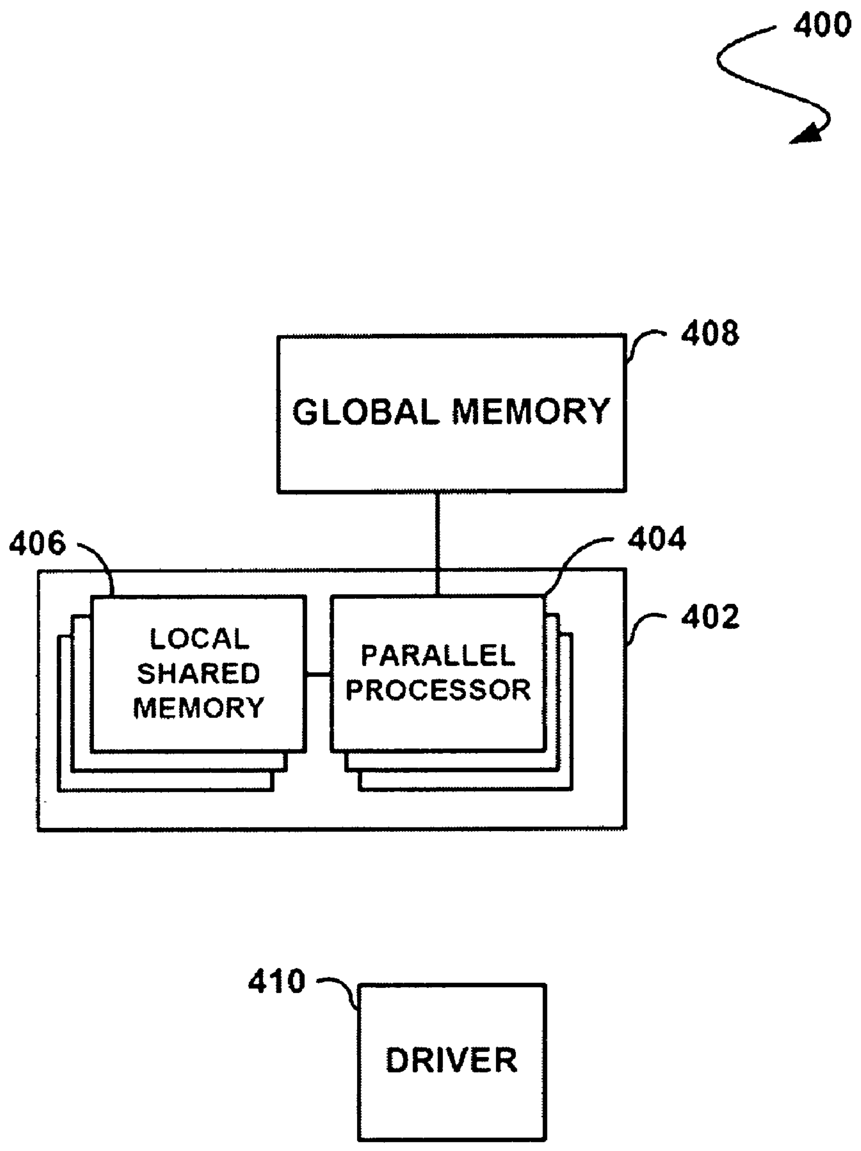
FIG. 4 shows a system for providing parallel processing, in accordance with still yet another embodiment.

FIG. 4 shows a system 400 for providing parallel processing, in accordance with still yet another embodiment. As an option, the system 400 may be implemented in the context and/or environment of FIGS. 1-3. Of course, however, the system 400 may be implemented in any desired environment. Yet again, it should be noted that the aforementioned definitions may apply during the present description.

As shown, a parallel processing architecture 402 is provided. Such parallel processing architecture 402 includes a plurality of parallel processors 404. While not shown, such parallel processors 404 may be capable of operating on a predetermined number of threads. To this end, each of the parallel processors 404 may operate in parallel, while the corresponding threads may also operate in parallel.

In one embodiment, the parallel processing architecture 402 may include a single instruction multiple data (SIMD) architecture. In such a system, the threads being executed by the processor are collected into groups such that, at any instant in time, all threads within a single group are executing precisely the same instruction but on potentially different data.

In another embodiment, the foregoing parallel processing architecture 402 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 402 may include a processor with one or more vector processing elements such as the Cell processor, referring to the Cell Broadband Engine microprocessor architecture jointly developed by Sony®, Toshiba®, and IBM®.

With continuing reference to FIG. 4, the parallel processing architecture 402 includes local shared memory 406. Each of the parallel processors 404 of the parallel processing architecture 402 may read and/or write to its own local shared memory 406. This shared memory 406 may consist of physically separate memories associated with each processor or it may consist of separately allocated regions of one or more memories shared amongst the processors 404. Further, in the illustrated embodiment, the shared memory 406 may be embodied on an integrated circuit on which the processors 404 of the parallel processing architecture 402 are embodied.

Still yet, global memory 408 is shown to be included. In use, such global memory 408 is accessible to all the processors 404 of the parallel processing architecture 402. As shown, such global memory 408 may be embodied on an integrated circuit that is separate from the integrated circuit on which the processors 404 of the aforementioned parallel processing architecture 402 are embodied. While the parallel processing architecture 402 is shown to be embodied on the various integrated circuits of FIG. 4 in a specific manner, it should be noted that the system components may or may not be embodied on the same integrated circuit, as desired.

Still yet, the present system 400 of FIG. 4 may further include a driver 410 for controlling the parallel processing architecture 402, as desired. In one embodiment, the driver 410 may include a library, for facilitating such control. For example, such library 410 may include a library call that may instantiate the functionality set forth herein. Further, in another embodiment, the driver 410 may be capable of providing general computational capabilities utilizing the parallel processing architecture 402 (e.g. a graphics processor, etc.). An example of such a driver may be provided in conjunction with the CUDA™ framework provided by NVIDIA Corporation. In use, the driver 410 may be used to control the parallel processing architecture 402 to identify unwanted content stored in a frame buffer and prevent display of the unwanted content based on the identification thereof.

Figure 5:
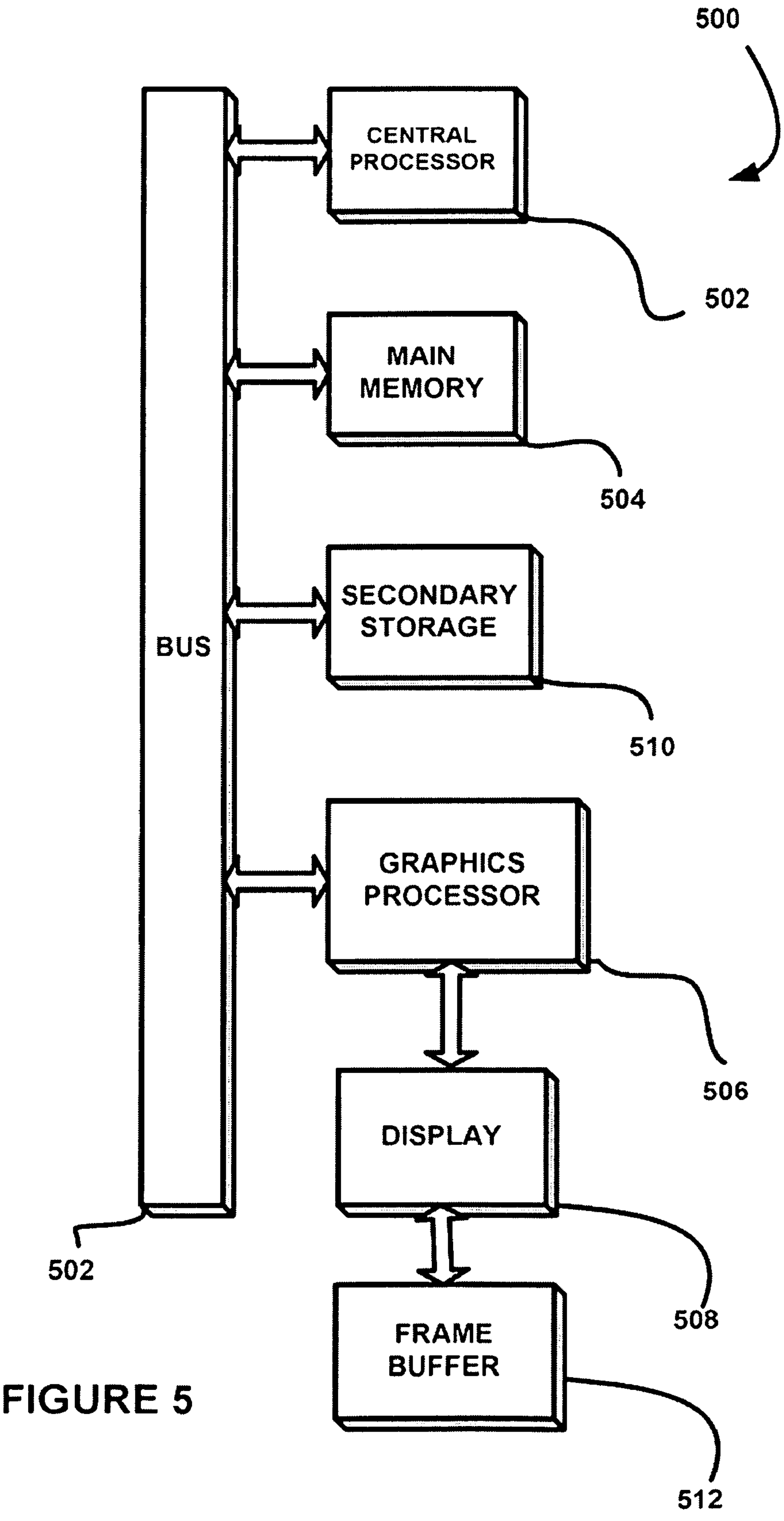
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a GPU. Additionally, the graphics processor may be in communication with a frame buffer 512.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices m including, but not limited to a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

determining a load of an integrated circuit including shader hardware with graphics processing capabilities;

receiving an automatically generated command based on the load of the integrated circuit including shader hardware with graphics processing capabilities;

in response to the automatically generated command, identifying unwanted content stored in a frame buffer, utilizing the integrated circuit including shader hardware with graphics processing capabilities; and preventing display of the unwanted content based on the identification of the unwanted content, utilizing the integrated circuit including shader hardware with graphics processing capabilities;

wherein the shader hardware is capable of performing the identifying and the preventing in parallel with other graphics processing including executing at least one shader program.

2. The method of claim 1, wherein the unwanted content includes visual content.

3. The method of claim 2, wherein the unwanted content includes pornography.

4. The method of claim 2, wherein the unwanted content includes video.

5. The method of claim 1, wherein the display of the unwanted content includes display via a television.

6. The method of claim 1, wherein the display of the unwanted content includes display via a personal computer.

7. The method of claim 1, wherein the identifying and the preventing are performed by the shader hardware of the integrated circuit, the integrated circuit including a graphics processor.

8. The method of claim 7, wherein the graphics processor includes a graphics processing unit (CPU).

9. The method of claim 1, wherein the shader hardware is incapable of being disabled.

10. The method of claim 1, wherein the unwanted content is prevented from being displayed by overwriting the unwanted content stored in the frame buffer with predefined content.

11. The method of claim 10, wherein the predefined content includes a warning.

12. The method of claim 1, wherein the other graphics processing further includes rendering two dimensional content.

13. The method of claim 1, wherein the unwanted content is further identified in response to a manually generated command to enable analysis of content stored in the frame buffer.

14. The method of claim 1, wherein the command is automatically generated only if the load of the integrated circuit including shader hardware with graphics processing capabilities is below a predefined threshold.

15. The method of claim 1, wherein the integrated circuit includes a parallel processing architecture system, where a driver including a library is included for controlling the parallel processing architecture system, the library including a library call that instantiates the identifying and the preventing.

16. A computer program product embodied on a tangible computer readable medium, comprising:

computer code for determining a load of an integrated circuit including shader hardware with graphics processing capabilities;

computer code for receiving an automatically generated command based on the load of the integrated circuit including shader hardware with graphics processing capabilities;

computer code for, in response to the automatically generated command, identifying unwanted content stored in a frame buffer, utilizing the integrated circuit including shader hardware with graphics processing capabilities; and computer code for preventing display of the unwanted content based on the identification of the unwanted content, utilizing the integrated circuit including shader hardware with graphics processing capabilities;

wherein the shader hardware is capable of the identifying and the preventing, in parallel with other graphics processing including executing at least one shader program.

17. An apparatus, comprising:

a processor for determining a load of an integrated circuit including shader hardware with graphics processing capabilities, receiving an automatically generated command based on the load of the integrated circuit including shader hardware with graphics processing capabilities, identifying unwanted content stored in a frame buffer in response to the automatically generated command, utilizing the integrated circuit including shader hardware with graphics processing capabilities, and preventing display of unwanted content based on an identification of the unwanted content, utilizing the integrated circuit including shader hardware with graphics processing capabilities;

wherein the shader hardware is capable of performing the identifying and the preventing, in parallel with other graphics processing including executing at least one shader program.

18. The apparatus of claim 17, wherein the processor remains in communication with memory and a display via a bus.

* * * * *

UNITED STATES PATENT AND TRADEMARK OFFICE

CERTIFICATE OF CORRECTION

PATENT NO. : 8,072,462 B2
APPLICATION NO. : 12/274955
DATED : December 6, 2011
INVENTOR(S) : Joseph Scott Stam It is certified that error appears in the above-identified patent and that said Letters Patent is hereby corrected as shown below:

In the claims:

Claim 8, col. 10, line 65; please replace “(CPU)” with --(GPU)--;

Claim 16, col. 12, line 8; please insert --performing-- before “the” and after “of”.

Signed and Sealed this
Tenth Day of April, 2012

David J. Kappos

David J. Kappos
*Director of the United States Patent and Trademark Office*